United States Patent Office 3,640,977
Patented Feb. 8, 1972

3,640,977
INTERPOLYMERS PREPARED FROM VINYL TOLUENE, ALPHA METHYL STYRENE DICYCLOPENTADIENE AND OPTIONALLY AN ACRYLIC COMPOUND
Carlos T. Gonzenbach, Scotia, and Manuel A. Jordan, Schenectady, N.Y., assignors to Schenectady Chemicals, Inc., Schenectady, N.Y.
No Drawing. Filed May 6, 1969, Ser. No. 822,294
Int. Cl. C08f 15/40, 1/58, 17/00
U.S. Cl. 260—80.78                    9 Claims

ABSTRACT OF THE DISCLOSURE

Terpolymers are made from vinyl toluene, alpha methyl styrene and dicyclopentadiene and tetrapolymers from these materials and acrylic acid or methacrylic acid or an alkyl ester of such acids. The preferred polymers are tetrapolymers including butyl acrylate. The polymers are useful as hot melt adhesives and hot melt coatings.

---

The present invention relates to novel terpolymers and tetrapolymers.

It is an object of the present invention to prepare novel terpolymers and tetrapolymers.

Another object is to prepare such polymers having a very low color.

An additional object is to prepare such polymers having improved properties compared to other polymers when used in adhesives and hot melts.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing terpolymers of 55–75% vinyl toluene, 5–20% (usually 5–18%) of alpha methyl styrene and 1 to 25% of dicyclopentadiene. Preferably there is prepared a tetrapolymer containing in addition to the three monomers specified above 2 to 15% of acrylic acid or methacrylic acid or an alkyl acrylate or methacrylate having 2 to 18 carbon atoms in the alkyl group. As alkyl acrylates and methacrylates there can be used, for example ethyl acrylate, ethyl methacrylate, butyl acrylate, butyl methacrylate, isobutyl acrylate, 2-ethylhexyl acrylate, 2-ethylhexyl methacrylate, dodecyl acrylate, dodecyl methacrylate, stearyl acrylate and stearyl methacrylate. The preferred acrylic compounds are acrylates, most preferably butyl acrylate. It has been found that the use of butyl acrylate moderates the exotherm in the polymerization reaction gives high yields or hard, light colored resins and gives superior physical properties to adhesives and hot melt compositions utilizing the polymer.

The polymers of the invention are water white or have a color of less than 1 on the Gardner scale.

The use of dicyclopentadiene in making the terpolymers and tetrapolymers gives adhesives having higher bond strengths than alpha methyl styrene-vinyl toluene copolymers.

Unless otherwise indicated all parts and percentages are by weight.

In the examples in the present case there was used either pure dicyclopentadiene or an impure dicyclopentadiene called dicyclopentadiene concentrate. Analysis of the dicyclopentadiene concentrate was as follows:

|  | Percent |
|---|---|
| $C_5$ compounds | 4.0 |
| $C_6$ compounds (aliphatic) | 1.0 |
| Benzene | 0.5 |
| $C_9$ codimers | 0.2 |
| $C_{10}$ codimers | 8.3 |
| Dicyclopentadiene | 85.6 |
| $C_{11}$ codimers | 0.4 |
| Trimers | 0.1 |

Contained cyclopentadiene (dicyclopentadiene plus ½ codimers) 90.0%, the $C_5$ compounds were pentanes 0.7%, pentenes 1.1%, isoprene 0.9%, piperylene 1.2% and cyclopentadiene 0.1%. The specific gravity of the dicyclopentadiene concentrate was 0.92 (7.7 lbs./gal.).

Polymerization can be carried out in any convenient fashion, e.g. see Davis Pat. 3,427,275 but is preferably carried out at −50° to 65° C. with the aid of a Friedel-Crafts catalyst. The most preferred temperature is around room temperature, e.g. 25–30° C. Any conventional Friedel-Crafts catalyst can be used, e.g. aluminum chloride, ferric chloride, beryllium chloride, stannic chloride or the like but the preferred catalysts are boron trifluoride in a concentration of 0.1 to 2%, preferably 0.3% of the total charge or titanium tetrachloride in a concentration of 0.2 to 1.5%, preferably 0.5% of the total charge. The boron fluoride, for example, can be introduced in an amount up to saturation.

The reaction is preferably carried out in an aliphatic or aromatic hydrocarbon solvent or a mixture of aliphatic and aromatic solvents. The solvent usually is 20 to 60%, preferably 33% of the total charge. There can be used benzene, toluene, xylene, higher alkyl benzenes, aromatic naphthas, aliphatic naphthanes, hexane, heptane, octane, decane, kerosene, petroleum ether, Stoddard solvent, an aliphatic solvent boiling between 300 and 400° F.), mineral spirits, etc. xylene is the preferred aromatic solvent. Unlike other solvents xylene appears to take part in the reaction to a certain extent. The preferred aliphatic solvent is heptane. Aliphatic solvents tend to give higher softening points and lighter resin.

The reaction can be carried out by either the "direct method of addition," i.e. the catalyst is added to the mixture of monomers and solvent or by the "reverse method of addition," i.e. the mixture of monomers is added to the solvent containing the catalyst.

The reactions are typically solution polymerizations. They were carried out in a reactor provided with a mechanical stirrer, an inert gas sparge, a thermometer and a vertical water cooled condenser. An external water-circulating cooling bath was used to dissipate the heat of reaction. In the preferred procedure the catalyst or monomeric mixture, as the case might be, was added to the reactor gradually maintaining the temperature at 25–30° C. When the reaction was completed the catalyst was deactivated with a 0.06% Triton X–102 solution in water. (Triton X–102 is isooctylphenol-ethylene oxide adduct having 12 to 13 oxyethylene units.) The polymerizate was then washed three times with plain water. The solvent and small portions of unreacted monomers were then distilled at a reduced pressure of about 30 mm. to an endpoint of about 180° C. pot temperature or until the desired softening point of the resin was obtained. The resinous product was then decanted, allowed to cool and the physical properties determined.

In the comparison examples Piccotex 100 and Piccotex 120 are copolymers of about 75% vinyl toluene and about 25% alpha methyl styrene prepared in accordance with Powers Pat. 3,000,868 using BF₃ catalyst. Piccotex 100 has a 100° C. softening point and Piccotex 120 has a 120° C. softening point (ball and ring) Elvax 260 is an ethylene-vinyl acetate copolymer (28% vinyl acetate).

Paisley Polymer used in the hot melt adhesive formulation is a commercially available amorphous atactic polypropylene hydrocarbon, specific gravity 0.86 at 77° F., softening point 290–320° F. (ball and ring).

EXAMPLE 1

13,608 grams of vinyltoluene, 2,722 grams of alpha-methyl styrene, 1,452 grams of dicyclopentadiene, 363 grams of butyl acrylate and 9,072 grams of 3° C. xylene were loaded to a 15 gallon stainless steel reactor. The reactor was provided with mechanical stirrer, a condenser, a sparge, a thermocouple and temperature register, and a heating and cooling jacket. The reactants were cooled to 10–20° C. and boron trifluoride was fed gradually through the sparge until no more heat of reaction was given off (i.e. the reaction was completed). The reaction temperature was allowed to increase to 25–30° C. The catalyst was deactivated with a 0.06% Triton X–102 in water. The polymerizate was subsequently washed with three portions of water. The solvent was then removed by distilling it over at subatmospheric pressures. A clear almost water white crystalline resin having a ball and ring softening point of 120° C. and a color less than 1 in the Gardner scale was obtained in 93.1% yield.

EXAMPLE 2

The same procedure as that employed in Example 1 was used to prepare a 121° C. softening point resin. 12,700 grams of vinyltoluene, 3,629 grams of alpha-methyl styrene, 1,452 grams of dicyclopentadiene, 363 grams of butyl acrylate and 9,072 grams of xylene were reacted with BF₃ catalyst. The catalyst was added to the reactants until the reaction was completed. The product of the reaction was a clear almost water white resin having a ball and ring softening point of 121° C.

EXAMPLE 3

The same procedure of Example 1 was again used to prepare a very high softening point resin. An aliphatic solvent, namely heptane, was used in place of the aromatic solvent. The following was charged to the pilot plant reactor and the reaction was initiated with BF₃ gas: 13,608 grams of vinyltoluene, 2,722 grams of alpha-methyl styrene, 908 grams of dicyclopentadiene, 908 grams of butyl acrylate and 9,072 grams of heptane. The catalyst was added to the reactants until the reaction was completed. The resin had a softening point of 131° C. (B and R), a color of less than 1 (Gardner scale) and it was obtained in 92.5% yield.

EXAMPLE 4

A mixture of an aromatic and an aliphatic hydrocarbon solvent was used for the preparation of a resin having a softening point of 75° C. The reaction was run by the reverse method of addition.

To a 12 liter three necked flask were added 1,666 grams of xylene and 833 grams of heptane. Boron trifluoride gas was bubbled through a sparge at room temperature until the solvent mixture was completely saturated. The following mixture was added from a separatory funnel: 3,750 grams of vinyltoluene, 750 grams of alpha-methyl styrene, 400 grams of redistilled dicyclopentadiene and 100 grams of butyl acrylate. The reaction temperature was maintained at 25–30° C. The product was a clear resin having a color of less than 1 (Gardner) and a softening point of 75° C. (B and R). It was obtained in 93.5% yield.

EXAMPLE 5

To a 15 gallon reactor were charged 13,608 grams of vinyltoluene 2,722 grams of alpha-methyl styrene, 1,815 grams of dicyclopentadiene and 9,072 grams of heptane. The reaction was initiated with boron trifluoride following the procedure of Example 1. The product was a resin having a Gardner color of 1 and a softening point of 123° C. Yield 90%.

EXAMPLE 6

750 grams of vinyltoluene, 150 grams of alpha-methyl styrene, 70 grams of dicyclopentadiene, 10 grams of divinylbenzene, 20 grams of butyl acrylate and 500 grams of xylene were charged to a 5 liter flask provided with a stirrer, thermometer, condenser and a sparge. BF₃ gas was gradually added until no more heat of reaction was given off. The reaction temperature was maintained at 25–30° C. The polymerizate was treated as in Example 1. The product was a resin having a Gardner color of less than 1 and a softening point of 122° C. (B and R). The resin yield was 96.6%.

The examples in the following Table 1 were carried out using the general procedure set forth supra. The reaction temperature was kept at about 25–30° C.

TABLE I

| Example | Solvent | Percent of total charge | Method of addition | V.T. | M.S. | DCPD | B.A. | M.A. | Yield | S.P. (° C.) |
|---|---|---|---|---|---|---|---|---|---|---|
| 7 | Hepatne | 33 | D | 75 | 15 | 10 | | | 96.0 | 132 |
| 8 | do | 33 | D | 75 | 5 | 20 | | | 86.9 | 120 |
| 9 | do | 33 | D | 75 | 15 | 5 | 5 | | 93.7 | 129 |
| 10 | do | 33 | D | 75 | 15 | 8* | 2 | | 93.7 | 125 |
| 11 | Xylene | 40 | D | 75 | 10 | 10* | 5 | | 98.7 | 101 |
| 12 | Heptane | 33 | D | 75 | 10 | 12* | 3 | | 94.6 | 131 |
| 13 | Xylene | 40 | D | 55 | 18 | 25* | 2 | | 98.8 | 98 |
| 14 | do | 50 | D | 75 | 10 | 12* | | 3 | 101.1 | 92 |
| 15 | do | 50 | D | 75 | 7 | 15* | | 3 | 102.9 | 89 |
| 16 | do | 33 | D | 75 | 15 | 10 | | | 98.0 | 111 |
| 17 | Heptane | 33 | D | 75 | 15 | 10 | | | 92.5 | 122 |
| 18 | Xylene | 33 | D | 75 | 5 | 20 | | | 104.3 | 100 |
| 19 | do | 50 | R | 75 | 15 | 10* | | | 110.0 | 68 |
| 20 | do | 33 | D | 75 | 5 | 20* | | | 103.5 | 100 |
| 21 | Xyl-Hep (2:1) | 33 | R | 75 | 15 | 8 | 2 | | 95.3 | 75 |
| 22 | Heptane | 33 | D | 75 | 15 | 5 | 5 | | 90.1 | 124 |
| 23 | Xylene | 33 | D | 75 | 15 | 8 | 2 | | 97.5 | 110 |

The catalyst employed was BF₃ and it was added until completion of the reaction except in Examples 19 and 21 in which it was added to saturation.

In the table, V.T. stands for vinyl toluene, M.S. for α-methyl styrene, DCPD for dicyclopentadiene (an * after the DCPD indicates DCPD concentrate was used), B.A. for butyl acrylate, M.A. for methyl methacrylate, D for direct method of addition and R for reverse method of addition. All softening points were by Ball and Ring. The color of the resins produced was 1 on the Gardner scale except for Example 9 where the color was water white, Example 13 where the color was 1 and Example 2 where the color was 2. The reason for yields above 100% in a few of the examples was due to some reaction of the xylene solvent.

The products of the present invention were tested in hot melt adhesive applications and compared with piccotex 100 and Piccotex 120 in two different hot melt adhesive formulations. Both formulations were tested for adhesion on (1) kraft to kraft paper (K/K), (2) kraft to Mylar (polyethylene terephthalate film) (K/M), (3) kraft to aluminum foil (K/A), (4) kraft to cellophane (K/C), and (5) kraft to vinyl film (vinyl chloride polymer) (K/V).

Formulation 1 was composed of:

| | Grams |
|---|---|
| Elvax 260 | 60 |
| Resin being tested | 50 |
| Paraffin | 90 |

Formulation 2 was composed of:

| | |
|---|---|
| Paisley polymer | 120 |
| Resin being tested | 60 |
| Micro wax | 20 |

Formulation 1 was prepared by melting the paraffin, adding the resin with stirring, then adding the Elvax and continuing the heating and stirring until a homogeneous melt was obtained.

Formulation 2 was prepared by melting the resin, adding the microwax, adding the Paisley polymer with stirring after the microwax had melted and heating and stirring was continued until a homogeneous melt was obtained and the melt then cooled to room temperature.

The hot melt adhesive was then coated on kraft paper at 325° F., cooled and samples of the coated kraft paper placed on samples of five different uncoated substrates (kraft, Mylar, aluminum foil, cellophane and vinyl). The pieces to be sealed (coated kraft on top) were placed in a heat sealer maintained at 225° F., for 1 second.

The sealed samples were then tested for peel adhesion at room temperature on the Tinius Olsen machine using the 20-pound load cell and at a rate of 2 inches per minute. The results are set forth in Table 2.

The resins were also applied in hot melt coatings. The test procedure was identical to that set forth above. The coating formulation was:

| | Grams |
|---|---|
| Resin to be tested | 60 |
| Paraffin | 180 |
| Microwax | 100 |
| Elvax 250 (ethylene-vinyl acetate copolymer with the ethylene predominating) | 60 |

The formulation was prepared by melting the paraffin, adding the microwax and after the microwax had melted adding the resin with stirring. After the resin had dissolved the Elvax 250 was added with stirring. Heating and stirring was continued until a homogeneous melt was obtained. The melt was then cooled to room temperature. The hot melt coating was then coated and tested in the manner described for the hot melt adhesives and the results were as recorded in Table 3.

TABLE 2

| Formulation | Resin | Softening point (°C.) | Adhesion (lbs. per linear inch) | | | | |
|---|---|---|---|---|---|---|---|
| | | | K/K | K/M | K/F | K/C | K/V |
| 1 | Piccotex 100 | 100 | 1.7 | 2.5 | 0.6 | 0.2 | 0.3 |
| | Piccotex 120 | 120 | 1.3 | 1.4 | 0.1 | 0.2 | 0.2 |
| | Example 21 | 75 | 2.4 | 0.1 | 0.4 | 1.6 | 0.4 |
| | Example 22 | 120 | 1.9 | 2.3 | 0.5 | 0.8 | 0.5 |
| 2 | Piccotex 100 | 100 | 0.2 | 0.8 | 0.3 | 0.2 | 0.2 |
| | Piccotex 120 | 120 | 0.1 | 0.2 | 0.1 | 0.1 | 0.1 |
| | Example 19 | 68 | 0.5 | 0.2 | 0.4 | 0.5 | 0.4 |
| | Example 21 | 75 | 1.5 | 1.6 | 1.2 | 0.5 | 0.5 |
| | Example 15 | 89 | 0.8 | | 0.3 | 0.3 | 0.3 |
| | Example 20 | 100 | 0.8 | 0.1 | 0.3 | 0.3 | 0.4 |
| | Example 18 | 100 | 0.8 | 0.1 | 0.4 | 0.5 | 0.2 |
| | Example 23 | 110 | 0.8 | 0.7 | 0.1 | 0.3 | 0.1 |
| | Example 17 | 122 | 0.8 | 0.3 | 0.4 | 0.6 | 0.4 |

TABLE 3

| Resin | Adhesion (lbs. per linear inch) | | | | |
|---|---|---|---|---|---|
| | K/K | K/M | K/F | K/C | K/V |
| Piccotex 100 | 0.2 | 0.4 | 0.1 | 0.4 | 0.1 |
| Piccotex 120 | 0.5 | 2.8 | 0.6 | 0.1 | 9.2 |
| Example 16 | ¹1.4 | ¹1.0 | 0.4 | 0.2 | 0.1 |
| Example 23 | ¹1.1 | ¹1.7 | 0.3 | 0.1 | 0.2 |

¹ There was fabric tear.

PATENTS OF INTEREST

Ruffing—2,987,508, June 6, 1961
Powers—3,000,868, Sept. 19, 1961
Davis—3,427,275, Feb. 11, 1969
Arnold—3,429,843, Feb. 25, 1969

What is claimed is:

1. A solid resinous polymer of 55 to 75% vinyl toluene, 5 to 20% alpha methyl styrene, 1 to 25% of dicyclopentadiene and 0 to 15% of an acrylic compound selected from the group consisting of acrylic acid, methacrylic acid, an alkyl acrylate and an alkyl methacrylate having 2 to 18 carbon atoms in the alkyl group of said acrylate or methacrylate.

2. A terpolymer according to claim 1 consisting essentially of vinyl toluene, alpha methyl styrene and dicyclopentadiene.

3. A tetrapolymer according to claim 1 consisting essentially of 55 to 75% vinyl toluene, 5 to 20% alpha methyl styrene, 1 to 25% dicyclopentadiene and 2 to 15% of said acrylic compound.

4. A tetrapolymer according to claim 3 wherein said acrylic compound is an alkyl acrylate.

5. A tetrapolymer according to claim 4 wherein said alkyl acrylate is butyl acrylate.

6. A tetrapolymer according to claim 4 wherein the alpha methyl styrene is 5 to 18%, the cyclopentadiene is 5 to 25% and the alkyl acrylate is 2 to 5%.

7. A tetrapolymer according to claim 6 wherein the alkyl acrylate is butyl acrylate.

8. A tetrapolymer according to claim 7 wherein the polymer contains 75% vinyl toluene, 15% alpha-methyl styrene, 8% dicyclopentadiene and 2% butyl acrylate.

9. A tetrapolymer according to claim 7 having a ball and ring softening point of 68 to 131° C.

References Cited

UNITED STATES PATENTS

| 3,427,275 | 2/1969 | Davis et al. | 260—31.8 |
| 3,487,054 | 12/1969 | Minnerly et al. | 260—79.5 |
| 3,459,699 | 8/1969 | Levine et al. | 260—29.7 |

JAMES A. SEIDLECK, Primary Examiner

R. A. GAITHER, Assistant Examiner

U.S. Cl. X.R.

260—28.5 A, 80.8, 80.81; 117—161 H